US012777409B2

(12) United States Patent
Mukherjee et al.

(10) Patent No.: US 12,777,409 B2
(45) Date of Patent: Oct. 27, 2026

(54) ENDPOINT SELECTION FOR PLACEMENT OF NETWORK SLICE(S) IN A 5G NETWORK

(71) Applicant: Cisco Technology, Inc., San Jose, CA (US)

(72) Inventors: Arghya Mukherjee, Acton, MA (US); John J Mullooly, Colts Neck, NJ (US); Robert Crowe, Apex, NC (US); Waris Sagheer, San Ramon, CA (US)

(73) Assignee: Cisco Technology, Inc., CA (US)

( * ) Notice: Subject to any disclaimer, the term of this patent is extended or adjusted under 35 U.S.C. 154(b) by 392 days.

(21) Appl. No.: 18/444,042

(22) Filed: Feb. 16, 2024

(65) Prior Publication Data

US 2025/0267558 A1 Aug. 21, 2025

(51) Int. Cl.
*H04W 48/16* (2009.01)
*H04W 48/18* (2009.01)

(52) U.S. Cl.
CPC ........... *H04W 48/16* (2013.01); *H04W 48/18* (2013.01)

(58) Field of Classification Search
CPC ......... H04W 41/0894; H04W 41/5048; H04W 41/0213; H04W 41/5009; H04W 65/1063; H04W 47/24; H04W 43/0876; H04W 48/16; H04W 48/18
USPC .......................................................... 370/254
See application file for complete search history.

(56) References Cited

U.S. PATENT DOCUMENTS 8,204,992 B2 * 6/2012 Arora ...................... H04L 63/08 713/168
9,780,909 B2 * 10/2017 Wood ..................... H04B 10/27
10,541,877 B2 * 1/2020 Bainbridge ......... H04L 41/0806
11,296,935 B2 * 4/2022 Nolan ................. G06F 16/1824
11,431,561 B2 * 8/2022 Smith ................. G06F 16/1824
11,502,909 B2 * 11/2022 Xu ...................... H04L 41/0213
11,916,730 B2 * 2/2024 Nolan ................. G06F 16/1824
12,003,660 B2 * 6/2024 Bernardi ............... H04L 67/104
12,212,361 B2 * 1/2025 Kodaypak ........ H04B 10/25752
12,218,795 B2 * 2/2025 Smith ................. G06F 16/1824
12,273,240 B2 * 4/2025 Hu ...................... H04L 43/0876
(Continued)

FOREIGN PATENT DOCUMENTS

DE 112017006701 T5 * 9/2019 ............. H04W 4/08
EP 3639536 B1 * 6/2024 ............ H04L 41/12
(Continued)

*Primary Examiner* — William D Cumming
(74) *Attorney, Agent, or Firm* — Lee & Hayes, P.C.

(57) ABSTRACT

Techniques and mechanisms for enabling an end-to-end controller of a network to offload decisions about placement of network slices to the transport controller. By doing so, the transport controller can intelligently determine optimal placement based on intent (e.g., external intent of the end-to-end controller and internal intent of the transport controller), internal transport network analytics functions, SLO/SLE constraints, real-time telemetry data, and more to provide dynamic and optimal placement of network slices. That is the described techniques dynamically utilize information from within the transport domain to define the placement of network slices. Thus, placements are more accurate, thereby reducing latency and improving functioning of the network, as well as providing an improved user experience by meeting SLO/SLE constraints.

20 Claims, 9 Drawing Sheets

(56) References Cited

U.S. PATENT DOCUMENTS

| | | | | |
|---|---|---|---|---|
| 12,376,017 | B2 * | 7/2025 | John | H04L 41/0895 |
| 12,609,970 | B2 * | 4/2026 | Bainbridge | H04L 65/1063 |
| 2004/0064568 | A1 * | 4/2004 | Arora | H04L 63/08 709/228 |
| 2018/0317134 | A1 | 11/2018 | Leroux et al. | |
| 2019/0349254 | A1 * | 11/2019 | Nolan | G06F 16/1824 |
| 2019/0349426 | A1 * | 11/2019 | Smith | G06F 16/1824 |
| 2019/0372853 | A1 * | 12/2019 | Bainbridge | H04L 41/0806 |
| 2020/0145297 | A1 * | 5/2020 | Bainbridge | H04L 65/1063 |
| 2020/0177460 | A1 * | 6/2020 | Xu | H04L 41/0213 |
| 2022/0248321 | A1 * | 8/2022 | John | H04L 41/0895 |
| 2022/0294690 | A1 * | 9/2022 | Nolan | H04W 12/106 |
| 2023/0006889 | A1 | 1/2023 | Thyagaturu et al. | |
| 2023/0110131 | A1 * | 4/2023 | Smith | G06F 16/1824 370/254 |
| 2023/0216947 | A1 * | 7/2023 | Bernardi | H04L 67/10 713/150 |
| 2023/0275662 | A1 * | 8/2023 | Kodaypak | H04B 10/25752 398/115 |
| 2023/0336492 | A1 * | 10/2023 | Katsalis | H04L 47/24 |
| 2023/0362057 | A1 * | 11/2023 | Hu | H04L 41/0894 |
| 2024/0224099 | A1 * | 7/2024 | Dhamija | H04L 41/5009 |
| 2024/0235931 | A1 * | 7/2024 | Nolan | G06F 16/1824 |
| 2025/0220403 | A1 * | 7/2025 | Smith | H04W 4/70 |
| 2025/0267558 | A1 * | 8/2025 | Mukherjee | H04W 48/16 |
| 2026/0052458 | A1 * | 2/2026 | John | H04L 41/5048 |

FOREIGN PATENT DOCUMENTS

| | | | | | |
|---|---|---|---|---|---|
| EP | 3563521 | B1 | * | 5/2025 | H04L 67/562 |
| JP | 2025502759 | A | * | 1/2025 | H04W 28/24 |
| JP | 2025504708 | A | * | 2/2025 | H04L 41/5051 |
| JP | 7763349 | B2 | * | 10/2025 | H04W 28/24 |
| JP | 7777230 | B2 | * | 11/2025 | H04L 45/58 |
| KR | 20190100177 | A | * | 8/2019 | H04W 84/22 |
| KR | 102659439 | B1 | * | 4/2024 | H04L 41/12 |
| WO | WO-2018125989 | A2 | * | 7/2018 | H04W 4/08 |
| WO | WO-2018126077 | A1 | * | 7/2018 | H04L 67/1046 |
| WO | 2018224151 | A1 | | 12/2018 | |
| WO | WO-2019029267 | A1 | * | 2/2019 | H04W 24/02 |
| WO | WO-2020215104 | A2 | * | 10/2020 | H04W 48/18 |
| WO | 2021181408 | A1 | | 9/2021 | |
| WO | 2023122627 | A1 | | 6/2023 | |
| WO | WO-2023224601 | A1 | * | 11/2023 | H04W 28/24 |

* cited by examiner

ENDPOINT SELECTION FOR PLACEMENT OF NETWORK SLICE(S) IN A 5G NETWORK

TECHNICAL FIELD

The present disclosure relates generally to the field of networking, and more particularly to techniques for dynamically selecting endpoints for network slices within a 5G network.

BACKGROUND

Automation of network services is becoming more "intent based" to simplify the user experience and abstract the underlying complexities. One way of automating network services is by implementing "Network Slicing." Network slicing allows multiple logical networks to be created on top of a common shared physical network. Essentially this means segmenting parts of the network for different users and/or use cases. One example network that can be sliced is 5G networks. For example, 5G Network Slicing is becoming the recommended approach for both 5G mobile services and any generic transport service.

In a 5G network, a service providers may implement Network Slicing in order to dedicate portions of their network to meet their customers' specific needs. For example, in 5G networks, "Network Slicing," is where a user requests a specific service "intent" (or outcome) required to be provided by the network (i.e., Ultra-Reliable Low Latency (URLLC) or enhanced Mobile Broadband (eMBB) for high bandwidth services) with the expectation that the service provider can satisfy that intent. Additionally, the IETF has defined this "intent" as a set of Service Level Objectives (SLOs) (e.g., measurable constraints of delay, bandwidth, and loss), and Service Level Expectations (SLEs), (e.g., unmeasurable objectives such as "only transit encrypted links"). Along with the service intent, the user must select which endpoints (or Service Demarcation points (SDPs)) are required to be connected.

In 5G networks, these endpoints (SDPs) specify the transport network locations for the various components such as the User Plane Functions (UPFs) and the gNodeBs. The end-to-end controller of a 5G network uses the SDPs to dictate placement decisions for network slices that are assigned to the transport network, but this is unfortunately prior to determining if the transport network can even meet the service intent between the locations (e.g., datacenters, regions, etc.) of the SDPs. That is, the existing technology and IETF standards dictate that the endpoints are chosen by the end-to-end controller without consideration of whether the service intent can be met, and the decision is then sent to the network transport controller of the transport network for network path provisioning.

However, the selection of SDPs is a static decision that does not take into account real time topology information on which endpoints can best meet required SLO/SLE constraints. This results in endpoints being selected that may not meet required SLO/SLE constraints. Further, the selected endpoints may not represent the best or optimal pathway to meet the required constraints, resulting in less accurate placement of network slices.

Accordingly, there is a need to a more robust, accurate, and dynamic solution for slice endpoint selection and placement.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
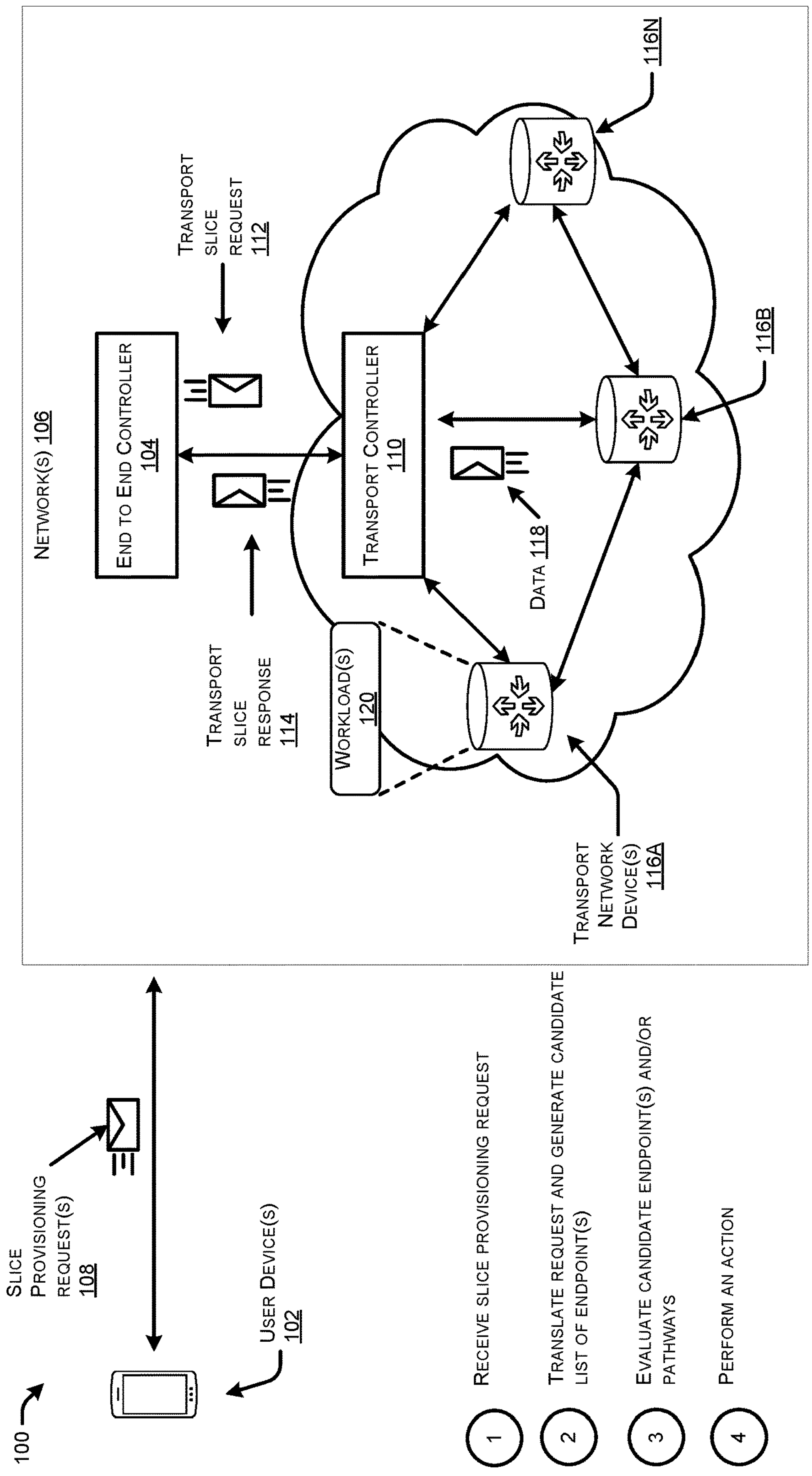
FIG. 1 illustrates a system-architecture diagrams of an environment in which dynamic endpoint selection based on transport conditions is supported.

The present disclosure relates generally to techniques for dynamically selecting endpoints for network slices within a 5G network.

A method to perform techniques described herein, where the method may be implemented by a transport controller of a transport network. In some examples, the method includes receiving, from a network orchestrator, a transport slice request associated with a network slice, the transport slice request comprising a list including a fixed endpoint, one or more candidate endpoints, and one or more constraints. In some examples, the method includes receiving, from transport devices within the transport network, data associated with the transport network. The method further includes evaluating, based at least in part on the data and the transport slice request, the one or more candidate endpoints for placement of the network slice. The method also includes sending, based at least in part on the evaluating, a transport slice response to the network orchestrator.

Another method to perform techniques described herein may be implemented by a transport controller of a transport network. The method may include receiving, from a network orchestrator, a transport slice request associated with a network slice, the transport slice request comprising a list including a fixed endpoint, one or more candidate endpoints, a constraint, and an intent. The method may include receiving, from transport devices within the transport network, data associated with the transport network. The method may include evaluating, based at least in part on the data and the transport slice request, pathways from the fixed endpoint to each candidate endpoint of the one or more candidate endpoints to determine an order of the pathways. The method may further include determining, based at least in part the intent and second data of the transport controller, an optimal pathway of the pathways between the fixed endpoint and a candidate endpoint. The method may also include provisioning, the optimal pathway from the fixed endpoint to the candidate endpoint for placement of the network slice. The method may include sending a transport slice response to the network orchestrator.

Additionally, the techniques described herein may be performed by a system and/or device having non-transitory computer-readable media storing computer-executable instructions that, when executed by one or more processors, performs the method described above.

EXAMPLE EMBODIMENTS

Automation of network services is becoming more "intent based" to simplify the user experience and abstract the underlying complexities. One way of automating network services is by implementing "Network Slicing." Network slicing allows multiple logical networks to be created on top of a common shared physical network. Essentially this means segmenting parts of the network for different users and/or use cases. One example network that can be sliced is 5G networks. For example, 5G Network Slicing is becoming the recommended approach for both 5G mobile services and any generic transport service.

In a 5G network, a service providers may implement Network Slicing in order to dedicate portions of their network to meet their customers' specific needs. For example, in 5G networks, "Network Slicing," is where a user requests a specific service "intent" (or outcome) required to be provided by the network (i.e., Ultra-Reliable Low Latency (URLLC) or enhanced Mobile Broadband (eMBB) for high bandwidth services) with the expectation that the service provider can satisfy that intent. Additionally, the IETF has defined this "intent" as a set of Service Level Objectives (SLOs) (e.g., measurable constraints of delay, bandwidth, and loss), and Service Level Expectations (SLEs), (e.g., unmeasurable objectives such as "only transit encrypted links"). Along with the service intent, the user must select which endpoints (or Service Demarcation points (SDPs)) are required to be connected.

In 5G networks, these endpoints (SDPs) specify the transport network locations for the various components such as the User Plane Functions (UPFs) and gNodeBs. The end-to-end controller of a 5G network uses the SDPs to dictate placement decisions for network slices that are assigned to the transport network, but this is done prior to determining if the transport network can even meet the service intent between the locations (e.g., datacenters, regions, etc.) of the SDPs. That is, the existing technology and IETF standards dictate that the endpoints are chosen by the end-to-end controller without consideration of whether the service intent can be met, and the decision is then sent to the network transport controller of the transport network for network path provisioning.

However, the selection of SDPs is a static decision that does not take into account real time topology information on which endpoints can best meet required SLO/SLE constraints. This results in endpoints being selected that may not meet required SLO/SLE constraints. Further, the selected endpoints may not represent the best or optimal pathway to meet the required constraints, resulting in less accurate placement of network slices.

Accordingly, there is a need to a more robust, accurate, and dynamic solution for slice endpoint selection and placement.

This disclosure describes techniques and mechanisms for utilizing a transport controller to provide a critical mapping from intent to the best actual transport network characteristics when selecting and placing network slices. For instance, the techniques may be implemented by a transport controller of a transport network. In some examples, the techniques include receiving, from a network orchestrator, a transport slice request associated with a network slice, the transport slice request comprising a list including a fixed endpoint, one or more candidate endpoints, and one or more constraints. In some examples, the techniques include receiving, from transport devices within the transport network, data associated with the transport network. The techniques further include evaluating, based at least in part on the data and the transport slice request, the one or more candidate endpoints for placement of the network slice. The techniques also include sending, based at least in part on the evaluating, a transport slice response to the network orchestrator.

Another method to perform techniques described herein may be implemented by a transport controller of a transport network. The techniques may include receiving, from a network orchestrator, a transport slice request associated with a network slice, the transport slice request comprising a list including a fixed endpoint, one or more candidate endpoints, a constraint, and an intent. The techniques may include receiving, from transport devices within the transport network, data associated with the transport network. The techniques may include evaluating, based at least in part on the data and the transport slice request, pathways from the fixed endpoint to each candidate endpoint of the one or more candidate endpoints to determine an order of the pathways. The techniques may further include determining, based at least in part the intent and second data of the transport controller, an optimal pathway of the pathways between the fixed endpoint and a candidate endpoint. The techniques may also include provisioning, the optimal pathway from the fixed endpoint to the best fit candidate endpoint for placement of the network slice. The techniques may include sending a transport slice response to the network orchestrator.

In some examples, the network orchestrator comprises an end-to-end controller within a network (e.g., such as a 5G network) that has visibility into all network layers. In some examples, the network slice may correspond to a location for a UPF. In some examples, the fixed endpoint may correspond to a location where the gNodeB is placed. In some examples, an endpoint (e.g., candidate endpoint or fixed endpoint) may comprise an SDP. In some examples, a candidate endpoint may correspond to a location where one or more UPFs are placed. In some examples, an endpoint may correspond to a datacenter. In some examples, the one or more constraints may comprise one or more SLO/SLE constraints, such as latency, bandwidth or more advanced policies. In some examples, the transport network is included as part of a 5G network. In some examples, the endpoints may correspond to one or more transport devices within a non-5G transport network. In some examples, the transport devices may correspond to one or more site(s), server(s), and/or datacenters.

In some examples, the data from the transport devices may comprise real-time telemetry data (e.g., CPU data, number of surfaces a transport device has, how loaded the transport device is, traffic volume, etc.). In some examples, the data comprises historical information associated with a transport device, analytic data, an existing slice placement, and reservation data.

In some examples, the network orchestrator may receive a slice provisioning request. The network orchestrator may translate the slice provisioning request into slice instance specific constraints (e.g., such as latency). In some examples, the network orchestrator may generate a list of candidate endpoints. For instance, the network orchestrator may access a database of the network to determine which sites (e.g., endpoints) have the capacity to bring up portion(s) or all of the network slice. As an example, the candidate list may comprise a fixed endpoint (e.g., such as endpoint A) and one or more candidate endpoints (e.g., endpoint X, endpoint Y, and endpoint Z). In some examples, the list may further comprise one or more constraints that need to be met for a particular user (such as latency), intent, etc. In some examples, the network orchestrator may send the list as part of a transport slice request to the transport controller of the transport network. In some examples, the list can be sent as part of a transport slice feasibility request. In this way, the network orchestrator may offload the decision of where to place a network slice to the transport controller, such that the decision is no longer static.

In some examples, such as where the transport controller receives the list as part of a transport slice request, the transport controller can evaluate each of the candidate endpoints and each pathway between the fixed endpoint to dynamically select and provision the optimal pathway. For instance, the transport controller may utilize telemetry data included in the data from the transport devices to evaluate whether each pathway can meet the constraint(s) in real-time. The transport controller may order the pathways based on best fit for meeting the constraint(s). In some examples, the transport controller may select and provision the pathway determined to be the best (e.g., optimal) fit for the constraints. In this way, the transport controller intelligently provisions a pathway for a network slice and sends the network orchestrator a response indicating the dynamic endpoint and pathway selected.

In some examples, such as where the transport controller receives the list as part of a transport slice feasibility request, the transport controller may evaluate candidate endpoint(s) to determine feasibility of each of the candidate endpoints. For instance, the transport controller may utilize the data to evaluate feasibility that the constraint(s) can be met by each of the candidate endpoints. The transport controller may order the candidate endpoints determined to be feasible based on best fit for meeting the constraint(s). In some examples, the transport controller may exclude one or more endpoints determined to not be feasible (e.g., not able to meet constraint(s)).

In some examples, the transport controller can utilize intent to evaluate each candidate endpoint and/or each pathway. For instance, the transport controller may utilize telemetry data, analytic data, and other data to evaluate whether each pathway can meet the constraint(s) in real-time. The transport controller may order the pathways based on best fit for meeting the constraint(s). The transport controller may consider intent when determining an optimal pathway. For instance, the transport controller may consider intent (e.g., intent of what the service associated with the slice provisioning request is for (e.g., streaming, etc.), intent of the network orchestrator (e.g., SLO/SLE constraints), and/or internal system information (e.g., tunnel affinity, availability of backup pathways, telemetry data, etc.) when determining an optimal pathway. In some examples, the transport controller may select and provision the pathway determined to be the best (e.g., optimal) fit based on the constraints and the intent. In this way, the transport controller intelligently provisions a pathway for a network slice and sends the network orchestrator a response indicating the dynamic endpoint and pathway selected.

In some examples, one or more machine learned models may be used to evaluate the one or more candidate endpoint (s) and/or the pathways. In some examples, the machine learning models may correspond to the IETF YANG model, that has been extended and augmented to provide candidate endpoints. In some examples, candidate endpoint(s), real-time telemetry data, and/or other information (e.g., analytic information, external intent, internal intent, historical information, etc.) may be input into the machine learning model and an ordered set of candidate endpoint(s) and/or pathway(s) may be output. In some examples, the machine learning models may be included as part of the end-to-end controller and/or the transport controller. In some examples, the end-to-end controller may utilize the machine learned models to generate a list of candidate endpoints.

Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

As noted above, prior to the techniques described herein, an end-to-end controller would receive a slice provisioning request with a constraint that an SLO of network delay to be less than 5 ms between a fixed endpoint (e.g., such as location A) and datacenter X (e.g., representing pathway A to X). The end-to-end controller would either (1) accept the slice provisioning request (e.g., a service will be provisioned), or (2) deny the slice provisioning request (e.g., based on determining there are no resources available to meet the SLO). Further, in existing technologies, many controllers simply do not have the intelligence to deny the slice provisioning request based on an SLO metric. In many cases, the service associated with the slice provisioning request may still be accepted and provisioned along with necessary Key Performance Indicators (KPIs), such as "less than a 5 ms delay", and then any available service assurance systems trigger an alarm that the KPIs have been exceeded.

In contrast to existing technologies, the techniques described herein may receive a slice service request for a specific SLO of network delay to be less than 5 ms between the fixed endpoint (e.g., location A) and "candidate" endpoint(s) of datacenter X, Y, and Z. Using the techniques described herein, the network transport controller may evaluate which of the three proposed destination endpoints (X, Y, or Z) is best to satisfy the request. Further, depending on the controller algorithm, if all three can satisfy the request, the transport controller may either randomly pick one of the candidate endpoints, round-robin across multiple requests to pick the next candidate endpoint on the list, pick a preferred candidate endpoint (i.e., "X", assuming this is a preferred order from the user), and/or use some other criteria to pick the best candidate endpoint and network path that best suits the service provider while still maintaining the user's SLO. Thus, the techniques described herein enable the transport controller, which has the best understanding of the real-time network conditions and existing slice reservations, to determine, out of the pool of candidate endpoints, which endpoint will best satisfy the requirement for the new slice being requested.

In this way, the techniques described herein enable an end-to-end controller to offload decisions about placement of network slices to the transport controller. By doing so, the transport controller can intelligently determine optimal placement based on intent (e.g., external intent of the end-to-end controller and internal intent of the transport controller), internal transport network analytics functions, SLO/SLE constraints, and real-time telemetry data, thereby providing dynamic and optimal placement of network slices. That is the described techniques dynamically utilize information from within the transport domain to define the placement of network slices (e.g., such as in the 5GC or RAN domains). Thus, placements are more accurate, thereby reducing latency and improving functioning of the network, as well as providing an improved user experience by meeting SLO/SLE constraints.

While the examples described focus on an embodiment related to a 5G network, it should be noted that the techniques described herein may apply to any network and/or service that provides transport services and supports an application across transport networks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagrams of an environment 100 in which dynamic endpoint selection based on transport conditions is supported. The user device(s) 102 may include one or more device(s), and may comprise any computing device, such as a mobile device, a laptop, a computer, a tablet, any Wi-Fi enabled device, any cellular enabled device, and/or any BLUETOOTH® enabled short-range wireless device. In some examples, the user device 102 may correspond to a device of an administrator (not shown). The user device 102 may include one or more application(s) (not shown).

In some examples, the user device 102 may communicate with one or more of an end-to-end controller 104 via network(s) 106. Network(s) 106 may include any combination of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. In some examples, the network(s) 106 may correspond to a private enterprise network, a cellular network (e.g., such as a 5g network), or any other type of network. The user device(s) 102 may communicate using any type of protocol over the network(s) 106, such as the transmission control protocol/Internet protocol (TCP/IP) that is used to govern connects to and over the Internet.

In some examples, the end-to-end controller 104 is configured to receive a slice provisioning request 108 from the user device 102. In some examples, the end-to-end controller 104 may comprise a computing device, processor(s), memory, etc. In some examples, the end-to-end controller 104 may correspond to a network orchestrator of the network 106. For instance, the end-to-end controller 104 may correspond to a NSMF of a 5G network.

In some examples, the end-to-end controller 104 is configured to communicate with one or more subdomains within the network 106. For instance, as illustrated in FIG. 1, the end-to-end controller 104 may communicate with a transport controller 110 of a transport network. For instance, the end-to-end controller 104 may send transport slice request(s) 112 to the transport controller 110. In some examples, the transport slice request(s) 112 may comprise a list. In some examples, the list may comprise a fixed endpoint (e.g., such as endpoint A) and one or more candidate endpoints (e.g., endpoint X, endpoint Y, and endpoint Z). In some examples, the fixed endpoint A may correspond to a first transport network device 116A and the one or more candidate endpoint(s) may correspond to one or more additional transport network device(s) 116B, 116N, etc. In some examples, the list may further comprise one or more constraints that need to be met for a particular user (such as latency), intent, etc. In some examples, the transport slice request 112 may correspond to a transport slice feasibility request.

In some examples, the transport controller 110 is configured to send transport slice response(s) 114 to the end-to-end controller 104. In some examples, the transport slice response 114 may correspond to a transport slice feasibility response. In some examples, the transport slice feasibility response may indicate an ordered list of one or more feasible candidate endpoints. In some examples, the transport slice response 114 indicates a provisioned pathway and/or endpoint and an indication of a connection to the provisioned endpoint (e.g., connection successful, etc.).

In some examples, the transport controller 110 is configured to communicate with transport network device(s) 116 within the transport network. For instance, the transport controller 110 may receive data 118 from the transport network device(s) 116. In some examples, the data may comprise real-time telemetry data. In some examples, the data from the transport devices may comprise real-time telemetry data (e.g., CPU data, number of surfaces a transport device has, how loaded the transport device is, traffic volume, etc.). In some examples, the data comprises historical information associated with a transport device, analytic data, an existing slice placement, and reservation data. In some examples, the transport devices may correspond to one or more site(s), server(s), and/or datacenters. In some examples, the transport network device(s) 116A are configured to communicate with one or more other transport network device(s) 116B, 116N, etc. In some examples, the transport network device(s) 116 are configured to execute one or more workload(s) 120. For instance, the workload(s) 120 may correspond to a network slice (e.g., such as a gNodeBs, UPFs, etc.).

In some examples, the transport controller 110 is configured to place network slice(s) at one or more endpoints. For instance, the transport controller 110 may provision network slice(s) automatically and dynamically and/or based on receiving instructions from the end-to-end controller 104, where the instructions indicate an endpoint to place workload 120 (e.g., such as a network slice, gNodeB, UPFs, etc.) at. In some examples, the fixed endpoint may correspond to a location where the gNodeB is placed. In some examples, an endpoint (e.g., candidate endpoint or fixed endpoint) may comprise an SDP. In some examples, a candidate endpoint may correspond to a location where one or more UPFs are placed. As noted above, the endpoints (e.g., candidate endpoint(s) and/or fixed endpoint(s)) may correspond to one or more of the transport network device(s) 116.

In some examples, an endpoint may correspond to a datacenter. In some examples, the one or more constraints may comprise one or more SLO/SLE constraints, such as latency. In some examples, the transport network is included as part of a 5G network. In some examples, the endpoints may correspond to one or more transport devices within the transport network. In some examples, the endpoints may correspond to one or more data centers. The one or more data centers may be physical facilities or buildings located across geographic areas that designated to store networked devices that are part of a manufacturer. The data centers may include various network devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings. In some examples, the endpoints may correspond to one or more network devices. In some examples, the network devices may correspond to any computing device, routers, switches, computers, or any other type of network device.

At “1”, the end-to-end controller may receive a slice provisioning request 108 from a user device. For instance, the end-to-end controller 104 may receive the slice provisioning request 108 from user device 102.

At “2”, the end-to-end controller 104 may translate the request and generate a candidate list of endpoint(s). For instance, the end-to-end controller 104 may translate the slice provisioning request into slice instance specific constraints (e.g., such as latency). In some examples, the end-to-end controller 104 may generate a list of candidate endpoints. For instance, the end-to-end controller 104 may access a database of the network 106 to determine which sites (e.g., endpoints) have the capacity to bring up portion(s) or all of the network slice. As an example, the candidate list may comprise a fixed endpoint (e.g., such as endpoint A) and one or more candidate endpoints (e.g., endpoint X, endpoint Y, and endpoint Z). In some examples, the list may further comprise one or more constraints that need to be met for a particular user (such as latency), intent, etc. In some examples, the end-to-end controller 104 may send the list as part of a transport slice request 112 to the transport controller 110 of the transport network. In some examples, the list can be sent as part of a transport slice feasibility request. In this way, the end-to-end controller 104 may offload the decision of where to place a network slice to the transport controller 110.

At “3”, the transport controller 110 may evaluate the candidate endpoint(s) and/or pathway(s). For instance, the transport controller 110 may evaluate each of the candidate endpoint(s) for feasibility. In some examples, the transport controller 110 may evaluate each of the pathways based on constraints indicated by the transport slice request. In some examples, the transport controller 110 may apply one evaluate each of the pathways based on different intent(s), internal system information, etc. In some examples, the transport controller 110 may utilize one or more machine learning model(s) to evaluate the candidate endpoint(s) and/or pathway(s).

At “4”, the transport controller 110 may perform an action. For instance, the transport controller 110 may send the end-to-end controller 104 an ordered list of feasible candidate endpoint(s). In some examples, the transport controller 110 may select and provision an optimal pathway and send the end-to-end controller a transport slice response 114 indicating the selected endpoint and successful connection.

In this way, the transport controller 110 can either (1) provision a network slice and send a message back to the end-to-end controller 104 indicated the dynamic endpoint used; or (2) hand-back a “dry-run” (feasibility indication) of the result (e.g., without provisioning a candidate endpoint) of suitable dynamic endpoints, such that the end-to-end controller 104 may decide to commit the change or not, given the endpoints selected.

Figure 2:
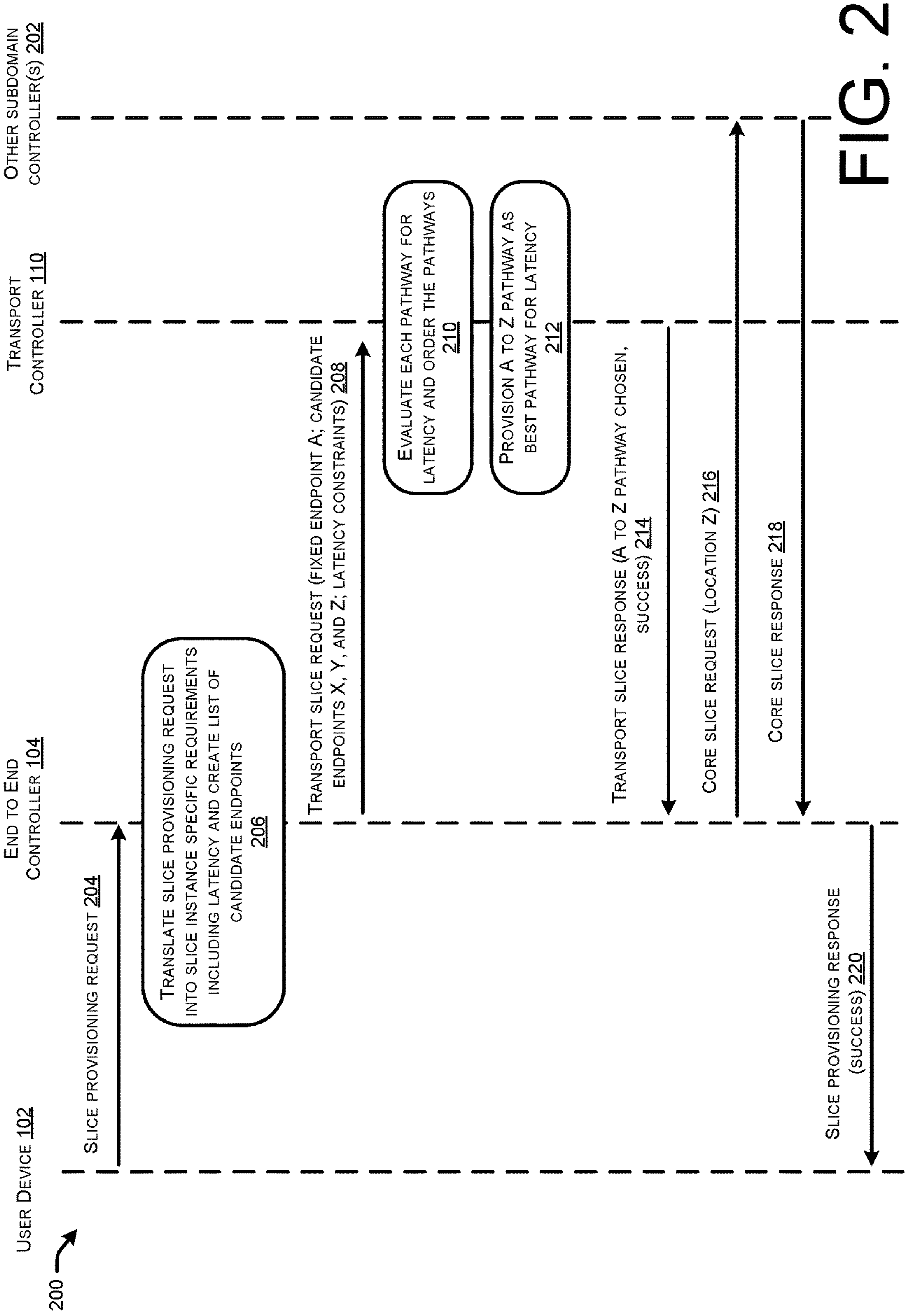
FIG. 2 illustrates a flow diagram of example communications corresponding to enabling a transport controller to dynamically evaluate and select a pathway based on a constraint and without a dry run (e.g., feasibility indication of each of the candidate endpoints).

FIG. 2 illustrates a flow diagram 200 of example communications corresponding to enabling a transport controller to dynamically evaluate and select a pathway based on a constraint and without a dry run (e.g., feasibility indication of each of the candidate endpoints). In the illustrated example, the constraint corresponds to latency, however any other suitable constraint may be used. Additionally, the illustrated example in FIG. 2 may correspond to an implementation of the described techniques that modify and extend the IETF-based YANG models to allow an end-to-end controller to request and receive a network slice with a list of candidate endpoints. That is FIG. 2 illustrates an example implementation that augments the IETF-based YANG model with a candidate SDP option. In some examples, the extension/augmentation of the IETF-based YANG model is optional, such that the standard behavior of the model may still work.

As illustrated, the system may include a user device 102 as described above. In some examples, the user device 102 corresponds to a customer facing controller (e.g., such as a user portal for accessing service(s) of the network 106). The system may include the end-to-end controller 104 and transport controller 110 described above. The system may also include other subdomain controller(s) 202. For instance, the other subdomain controller(s) 202 may correspond to other subdomain(s) and/or layers of the network 106. As an example, the other subdomain controller(s) 202 illustrated in FIG. 2 may correspond to a core network slice management function (C-NSSMF) of a 5G network.

As illustrated, at 204, the end-to-end controller 104 may receive a slice provisioning request 204 from the user device 102. For instance, the slice provisioning request 204 may be received from a customer facing controller of the user device 102. In some examples, the slice provisioning request 204 may be associated with a user of the user device 102 accessing a service of a service provider and/or the network 106. As noted above, the slice provisioning request 204 may comprise a service "intent" (or outcome) required to be provided by the network (i.e., Ultra-Reliable Low Latency (URLLC) or enhanced Mobile Broadband (eMBB) for high bandwidth services) with the expectation that the service provider can satisfy that intent. As noted above, the service intent may comprise one or more SLOs (e.g., measurable constraints of delay, bandwidth, and loss) and/or SLEs, (e.g., unmeasurable objectives such as "only transit encrypted links"). In some examples, the slice provisioning request may comprise an indication of one or more endpoints (or Service Demarcation points (SDPs)) to be connected.

At 206, the end-to-end controller 104 may translate the slice provisioning request into one or more slice instance specific requirements (e.g., constraint(s), including latency). In some examples, the end-to-end controller 104 generates a list of candidate endpoints. For example, the end-to-end controller 104 may access a database of the network 106 to determine which sites (e.g., endpoints) have the capacity to bring up portion(s) or all of the network slice and/or at least one of the slice instance specific constraint(s). As an example, the endpoints may comprise a fixed endpoint (e.g., such as endpoint A) and one or more candidate endpoints (e.g., endpoint X, endpoint Y, and endpoint Z). In some examples, the list may further comprise one or more constraints that need to be met for a particular user (such as latency), intent, etc. As noted above, the one or more constraint(s) may be designated by a user of the user device 102, such that the end-to-end controller 104 may identify and include one or more latency constraint(s) or other constraint(s) that need to be met.

At 208, the end-to-end controller 104 may send a transport slice request to the transport controller 110. The transport slice request 208 may comprise the list. As noted above the list may include a fixed endpoint (e.g., endpoint A) and one or more candidate endpoint(s) (e.g., candidate endpoint X, candidate endpoint Y, and candidate endpoint Z). The list may further comprise latency constraints that the end-to-end controller 104 needs to meet.

At 210, the transport controller 110 may evaluate each of the pathways for latency and may order the pathways. For instance, the transport controller 110 may receive data from one or more transport devices within the transport network. The data may comprise real-time telemetry data. The transport controller 110 may evaluate, using the telemetry data and/or one or more machine learning models, each of the pathways to determine whether each pathway can meet the latency constraint(s) included in the transport slice request. The transport controller 110 may then order the pathways based on which pathway best meets the latency constraint(s). As an example, the latency constraint(s) may indicate that latency for a pathway needs to be less than 20 ms. The transport controller 110 may determine, based on the real-time telemetry data, that pathways A to X (e.g., from fixed endpoint A to candidate endpoint X), A to Y (e.g., from fixed endpoint A to candidate endpoint Y), and A to Z (e.g., from fixed endpoint A to candidate endpoint Z) each have a latency that is less than 20 ms. The transport controller 110 may then order the pathways based on determining which pathway has the lowest latency time. For instance, pathway A to Z may have the lowest latency time when compared to pathways A to X and A to Y. Accordingly, pathway A to Z may be identified as the best pathway based on the latency constraints.

At 212, the transport controller 110 may provision the A to Z pathway as the best pathway for latency. As noted above, based on identifying the A to Z pathway as having the lowest latency time of the pathways and meeting the latency constraint(s), the transport controller 110 may dynamically and automatically provision the A to Z pathway for the network slice. For instance, the transport controller 110 may decide the best place for the UPF is at endpoint Z and may make the connection between the fixed endpoint A and endpoint Z available and then communicate these results to the end-to-end controller such that the UPF can be deployed at that location.

At 214, the transport controller 110 may send a transport slice response to the end-to-end controller 104. In some examples, the transport slice response 214 may comprise an indication of the provisioned pathway (e.g., "A to Z pathway chosen") and a connection status of the pathway (e.g., "success").

At 216, the end-to-end controller 104 may send a core slice request to the other subdomain controller(s) 202. The core slice request 216 may indicate an endpoint (e.g., "location Z"). In some examples, location Z may correspond to endpoint Z.

At 218, the end-to-end controller 104 may receive a core slice response from the other subdomain controller(s) 202.

At 220, the end-to-end controller 104 may send a slice provisioning response to the user device 102. For instance, the slice provisioning response may be sent to the customer facing controller of the user device 102. In some examples, the slice provisioning response may comprise a status associated with whether the slice provisioning request 204 was completed. For example, the slice provisioning response 220 may indicate that the network slice was successfully provisioned.

Accordingly, the end-to-end controller may generate a transport slice request that comprises multiple candidate endpoints and then offloads the decision process to an intelligent network transport controller. In this way, the transport controller is better positioned to dynamically and automatically make a placement decision regarding the network slice, using data that is unavailable to the end-to-end orchestrator. Thus, the transport controller may utilize real-time network telemetry data (e.g., (high CPUs, how many surfaces it has, how loaded it is, how much traffic is going through it, etc.) from all transport devices in the pathway, historical information, and other analytic data, along with existing slice placement and reservation information, to dynamically select and provision the best endpoint (or set of endpoints) out of the candidate endpoints, which can then meet the desired SLO/SLE intent.

Figure 3A:
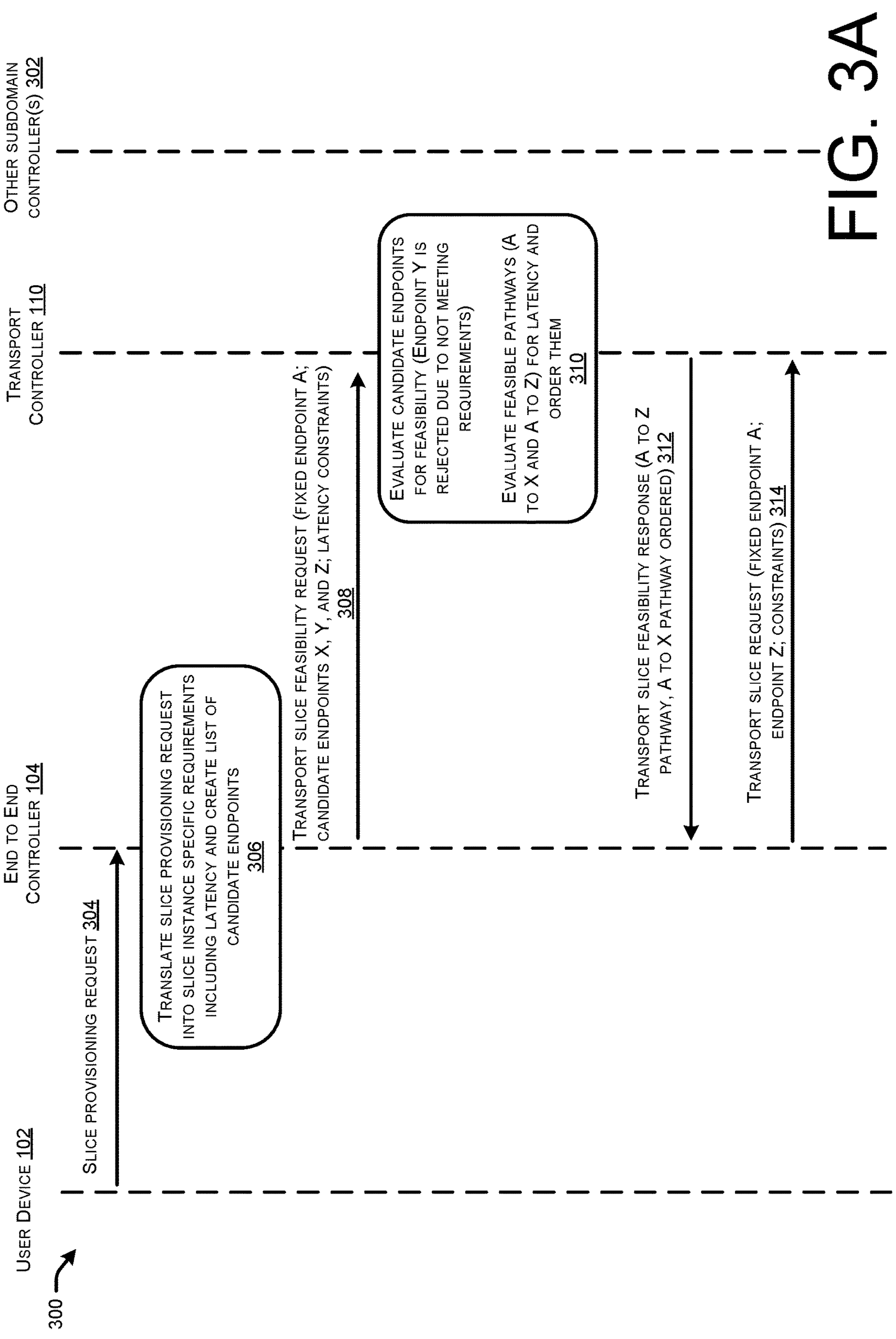
FIGS. 3A and 3B illustrate a flow diagram of example communications corresponding to enabling a transport controller to implement a dry run of potential endpoints for a network slice by evaluating feasibility of each candidate endpoint based on a constraint.
Figure 3B:
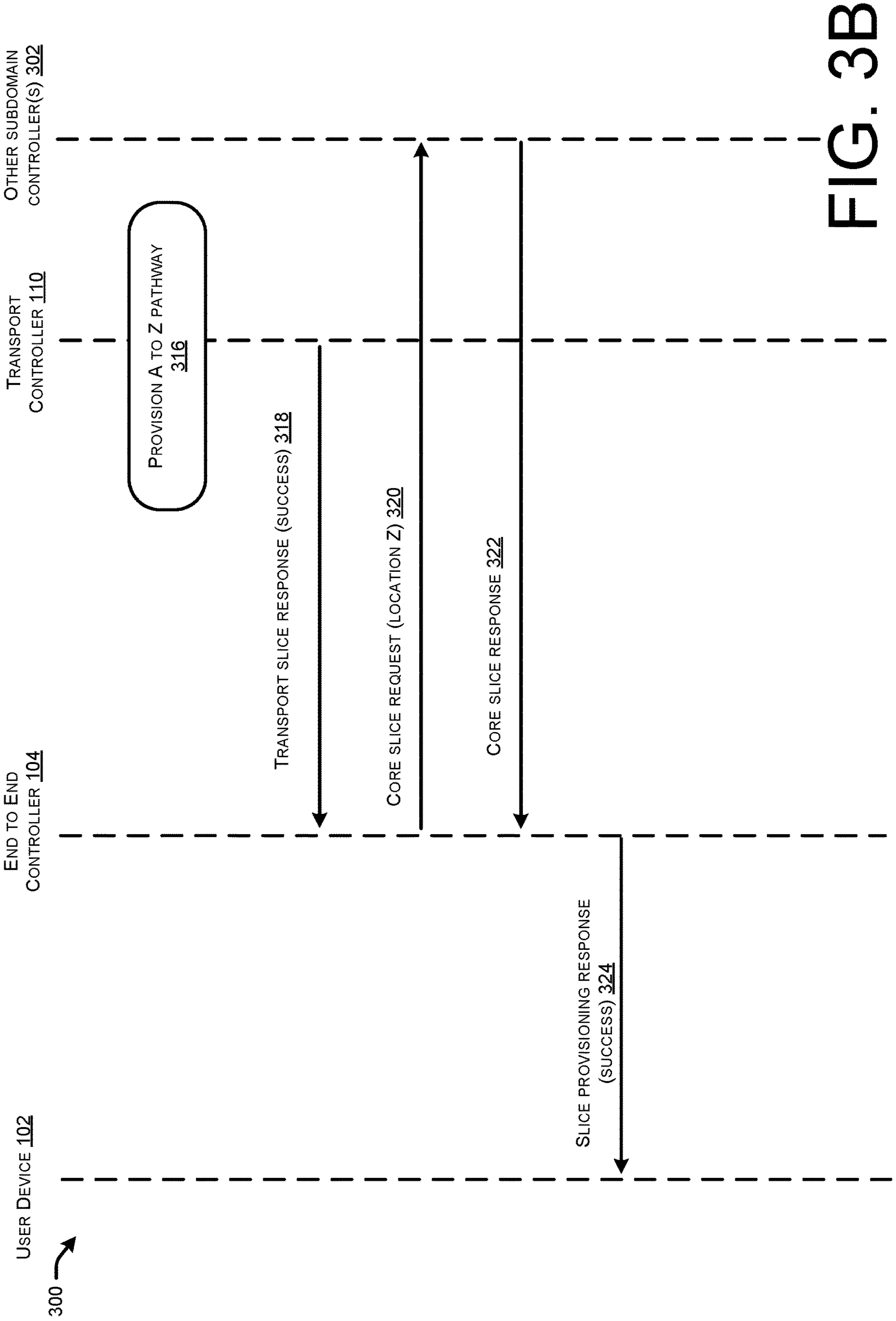

FIGS. 3A and 3B illustrate a flow diagram 300 of example communications corresponding to enabling a transport controller to implement a dry run of potential endpoints for a network slice by evaluating feasibility of each candidate endpoint based on a constraint. In the illustrated example, the constraint corresponds to latency, however any other suitable constraint may be used. In some examples, the communications correspond to an embodiment that enable the transport controller to determine an ordered list of feasible candidate endpoints based on current conditions of the transport network.

As illustrated, the system may include a user device 102 as described above. In some examples, the user device 102 corresponds to a customer facing controller (e.g., such as a user portal for accessing service(s) of the network 106). The system may include the end-to-end controller 104 and transport controller 110 described above. The system may also include other subdomain controller(s) 302. For instance, the other subdomain controller(s) 302 may correspond to other subdomain(s) and/or layers of the network 106. As an example, the other subdomain controller(s) 302 illustrated in FIGS. 3A and 3B may correspond to a core network slice management function (C-NSSMF) of a 5G network.

As illustrated in FIG. 3A, at 304, the end-to-end controller 104 may receive a slice provisioning request 204 from the user device 102. For instance, the slice provisioning request 204 may be received from a customer facing controller of the user device 102. In some examples, the slice provisioning request 304 may be associated with a user of the user device 102 accessing a service of a service provider and/or the network 106. As noted above, the slice provisioning request 304 may comprise a service "intent" (or outcome) required to be provided by the network (i.e., Ultra-Reliable Low Latency (URLLC) or enhanced Mobile Broadband (eMBB) for high bandwidth services) with the expectation that the service provider can satisfy that intent. As noted above, the service intent may comprise one or more SLOs (e.g., measurable constraints of delay, bandwidth, and loss) and/or SLEs, (e.g., unmeasurable objectives such as "only transit encrypted links"). In some examples, the slice provisioning request may comprise an indication of one or more endpoints (or Service Demarcation points (SDPs)) to be connected.

At 306, the end-to-end controller 104 may translate the slice provisioning request into one or more slice instance specific requirements (e.g., constraint(s), including latency). In some examples, the end-to-end controller 104 generates a list of candidate endpoints. For example, the end-to-end controller 104 may access a database of the network 106 to determine which sites (e.g., endpoints) have the capacity to bring up portion(s) or all of the network slice and/or at least one of the slice instance specific constraint(s). As an example, the endpoints may comprise a fixed endpoint (e.g., such as endpoint A) and one or more candidate endpoints (e.g., endpoint X, endpoint Y, and endpoint Z). In some examples, the list may further comprise one or more constraints that need to be met for a particular user (such as latency), intent, etc. As noted above, the one or more constraint(s) may be designated by a user of the user device 102, such that the end-to-end controller 104 may identify and include one or more latency constraint(s) or other constraint(s) that need to be met.

At 308, the end-to-end controller 104 may send a transport slice feasibility request to the transport controller 110. The transport slice feasibility request 308 may comprise the list. As noted above the list may include a fixed endpoint (e.g., endpoint A) and one or more candidate endpoint(s) (e.g., candidate endpoint X, candidate endpoint Y, and candidate endpoint Z). The list may further comprise latency constraints that the end-to-end controller 104 needs to meet. In some examples, the transport slice feasibility request 308 may comprise instructions to perform a dry run (e.g., evaluate feasibility of different candidate endpoint(s) and/or pathway(s)) given current conditions of the transport network.

At 310, the transport controller 110 may evaluate each of the candidate endpoints for feasibility. For instance, each candidate endpoint may be evaluated to determine whether latency condition(s) may be met. As illustrated in FIG. 3A, candidate endpoint Y is rejected due to not meeting requirements (e.g., latency condition(s)) indicated by the transport slice feasibility request. In some examples, the transport controller 110 may only evaluate the candidate endpoints for feasibility. That is, the transport controller 110 may not create pathways between the fixed endpoint A and each of the candidate endpoint(s). In this example, the transport controller 110 may order the feasible candidate endpoints based on best fit for the latency condition(s). In some examples, the transport controller 110 may additionally or alternatively evaluate feasibility of pathways between the fixed endpoint A and the feasible candidate endpoints (e.g., endpoint X and endpoint Z).

As noted above, the transport controller 110 may receive data from one or more transport devices within the transport network. The data may comprise real-time telemetry data. The transport controller 110 may evaluate, using the telemetry data and/or one or more machine learning models, each of the candidate endpoint(s) and/or pathways to determine whether they can meet the latency constraint(s) included in the transport slice feasibility request.

At 312, the transport controller 110 may send a transport slice feasibility response to the end-to-end controller 104. In some examples, the transport slice feasibility response 312 may comprise an ordered list of the feasible candidate endpoint(s) and/or the feasible pathway(s). As illustrated in FIG. 3A, the ordered list may indicate that feasible pathway A to Z is the best fit based on the latency conditions, and that feasible pathway A to X is also permissible (e.g., A to X also meets the latency conditions). As noted above, the transport slice feasibility response 312 may exclude candidate endpoint Y, based on the determination that candidate endpoint Y does not meet the latency constraints.

At 314, the end-to-end controller 104 may send a transport slice request to the transport controller 110. The transport slice request 314 may comprise an indication of the fixed endpoint and at least one of the candidate endpoints, along with one or more constraints. The transport slice request 314 may comprise instructions to provision the pathway from fixed endpoint A to selected endpoint Z. For instance, the end-to-end controller 104 may select the feasible A to Z pathway based on the determination that it is the best fit for latency constraints. The end-to-end controller 104 may select the feasible A to Z pathway (or a feasible candidate endpoint) based on other considerations as well, such as end-to-end information available to the end-to-end controller (e.g., optimization information, workload management information, etc.).

As illustrated in FIG. 3B, at 316, the transport controller 110 may provision the A to Z pathway in response to the instructions included in the transport slice request. For instance, the transport controller 110 may setup the connection such that a UPF can be placed at endpoint Z and may make the connection between the fixed endpoint A and endpoint Z available.

At 318, the transport controller 110 may send a transport slice response to the end-to-end controller 104. In some examples, the transport slice response 318 may comprise an indication of a connection status of the provisioned pathway (e.g., "success").

At 320, the end-to-end controller 104 may send a core slice request to the other subdomain controller(s) 302. The core slice request 320 may indicate an endpoint (e.g., "location Z"). In some examples, location Z may correspond to endpoint Z. In some examples, the core slice request may correspond to a second network slice. The second network slice may be different from the network slice associated with the network slice feasibility request 308. In some examples, the second network slice may correspond to a second portion of the network slice associated with the slice provisioning request 304.

At 322, the end-to-end controller 104 may receive a core slice response from the other subdomain controller(s) 302.

At 324, the end-to-end controller 104 may send a slice provisioning response to the user device 102. For instance, the slice provisioning response may be sent to the customer facing controller of the user device 102. In some examples, the slice provisioning response 324 may comprise a status associated with whether the slice provisioning request 304 was completed. For example, the slice provisioning response 324 may indicate that the network slice was successfully provisioned.

Accordingly, the transport controller may intelligently determine feasibility of candidate endpoint(s) based on current transport network conditions, such that the end-to-end controller may be better informed when selecting an endpoint and/or pathway. Thus, the transport controller may hand-back a "dry-run" (feasibility indication) of the result (e.g., without provisioning a candidate endpoint) of suitable dynamic endpoints, such that the end-to-end controller 104 may decide to commit the change or not, given the endpoints selected or recommended.

Figure 4A:
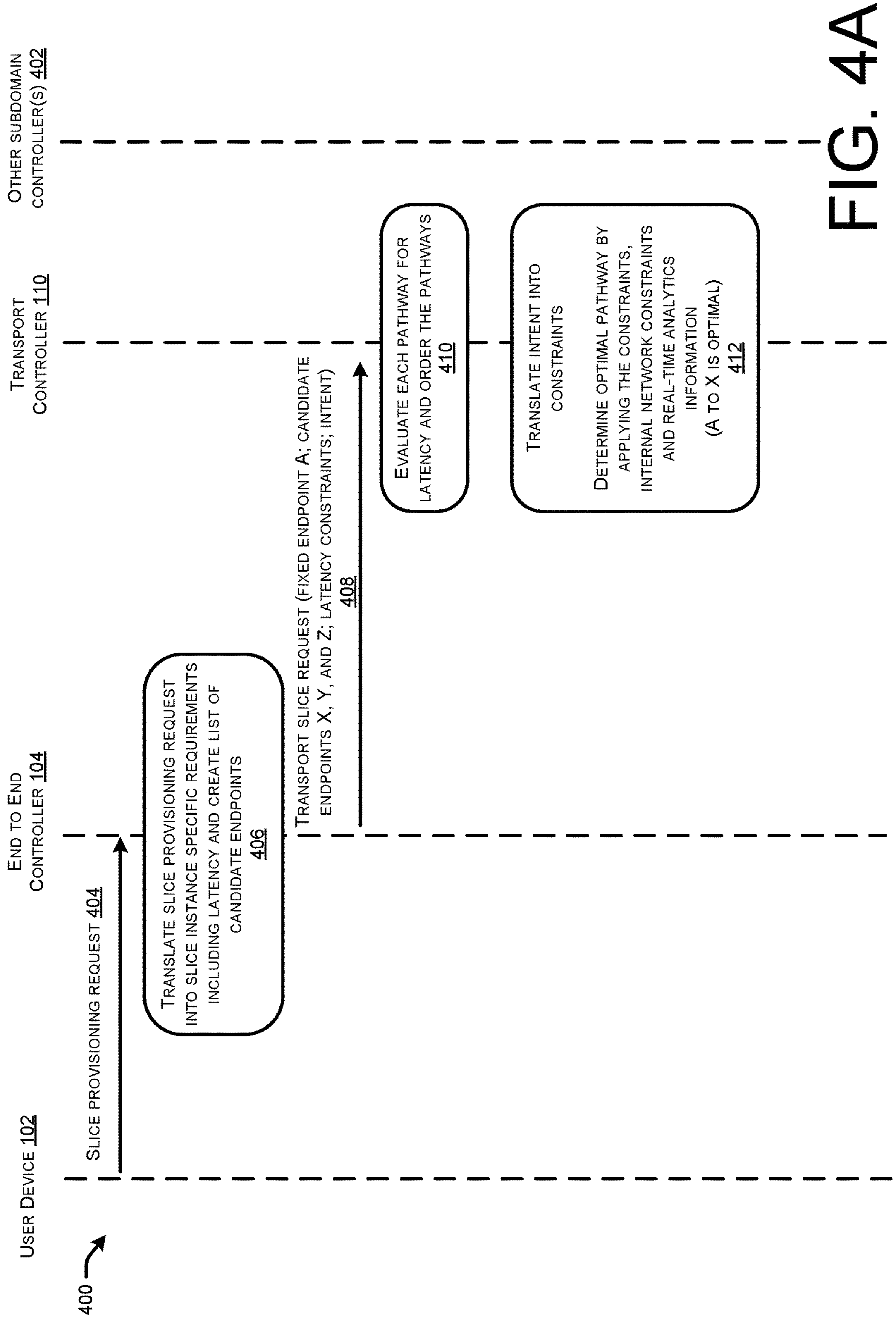
FIGS. 4A and 4B illustrate a flow diagram of example communications corresponding to enabling a transport controller to dynamically evaluate and select a pathway based on various constraints and intents.
Figure 4B:
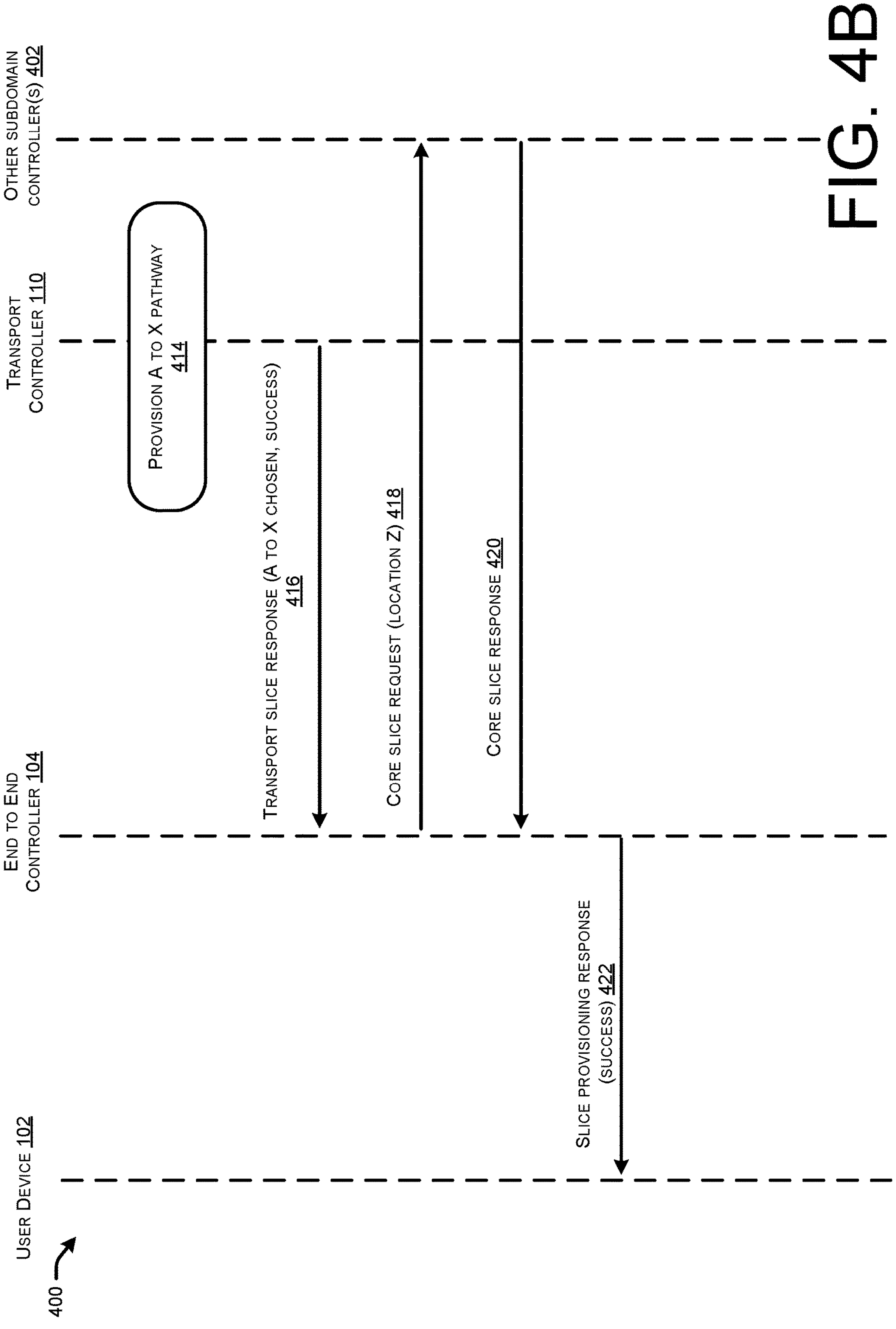

FIGS. 4A and 4B illustrate a flow diagram 400 of example communications corresponding to enabling a transport controller to dynamically evaluate and select a pathway based on various constraints and intents. For instance, FIGS. 4A and 4B correspond to an example embodiment where the transport controller may consider constraint(s) (e.g., latency and/or other SLO/SLE constraint(s)), external intent of the end-to-end controller (affinities, least number of hops, what the service is for, etc.), telemetry data, as well as internal network constraints/information (e.g., transport network state, how loaded router(s) are, tunnel affinity, availability of backup pathways when dynamically selecting and provisioning an optimal pathway for a network slice.

As illustrated, the system may include a user device 102 as described above. In some examples, the user device 102 corresponds to a customer facing controller (e.g., such as a user portal for accessing service(s) of the network 106). The system may include the end-to-end controller 104 and transport controller 110 described above. The system may also include other subdomain controller(s) 402. For instance, the other subdomain controller(s) 402 may correspond to other subdomain(s) and/or layers of the network 106. As an example, the other subdomain controller(s) 402 illustrated in FIGS. 4A and 4B may correspond to a core network slice management function (C-NSSMF) of a 5G network.

As illustrated in FIG. 4A, at 404, the end-to-end controller 104 may receive a slice provisioning request from the user device 102. For instance, the slice provisioning request 204 may be received from a customer facing controller of the user device 102. In some examples, the slice provisioning request 404 may be associated with a user of the user device 102 accessing a service of a service provider and/or the network 106. As noted above, the slice provisioning request 404 may comprise a service "intent" (or outcome) required to be provided by the network (i.e., Ultra-Reliable Low Latency (URLLC) or enhanced Mobile Broadband (eMBB) for high bandwidth services) with the expectation that the service provider can satisfy that intent. As noted above, the service intent may comprise one or more SLOs (e.g., measurable constraints of delay, bandwidth, and loss) and/or SLEs, (e.g., unmeasurable objectives such as "only transit encrypted links"). In some examples, the slice provisioning request may comprise an indication of one or more endpoints (or Service Demarcation points (SDPs)) to be connected.

At 406, the end-to-end controller 104 may translate the slice provisioning request into one or more slice instance specific requirements (e.g., constraint(s), such as SLO/SLE constraints, including latency). In some examples, the end-to-end controller 104 generates a list of candidate endpoints. For example, the end-to-end controller 104 may access a database of the network 106 to determine which sites (e.g., endpoints) have the capacity to bring up portion(s) or all of the network slice and/or at least one of the slice instance specific constraint(s). As an example, the endpoints may comprise a fixed endpoint (e.g., such as endpoint A, where a gNodeB is located) and one or more candidate endpoints (e.g., endpoint X, endpoint Y, and endpoint Z). In some examples, the list may further comprise one or more constraints that need to be met for a particular user (such as latency), intent (e.g., external intent of the end-to-end controller 104, intent of what the service is for, etc.), etc. As noted above, the one or more constraint(s) may be designated by a user of the user device 102, such that the end-to-end controller 104 may identify and include one or more latency constraint(s) or other SLO/SLE constraint(s) that need to be met.

At 408, the end-to-end controller 104 may send a transport slice request to the transport controller 110. The transport slice request 408 may comprise the list. As noted above the list may include a fixed endpoint (e.g., endpoint A) and one or more candidate endpoint(s) (e.g., candidate endpoint X, candidate endpoint Y, and candidate endpoint Z). The list may further comprise latency constraints that the end-to-end controller 104 needs to meet, intent, or other information.

At 410, the transport controller 110 may evaluate each candidate endpoint and each pathway for latency and may order the pathway(s) and/or candidate endpoint(s). For instance, the transport controller 110 may receive data from one or more transport devices within the transport network. The data may comprise real-time telemetry data. The transport controller 110 may evaluate, using the telemetry data and/or one or more machine learning models, each of the pathways to determine whether each pathway can meet the latency constraint(s) included in the transport slice request. The transport controller 110 may then order the pathways based on which pathway best meets the latency constraint(s). As an example, the latency constraint(s) may indicate that latency for a pathway needs to be less than 20 ms. The transport controller 110 may determine, based on the real-time telemetry data, that A to Y (e.g., from fixed endpoint A to candidate endpoint Y) has a latency greater than 20 ms, such that endpoint Y is rejected as not meeting the latency constraint. The transport controller 110 may determine pathways A to X (e.g., from fixed endpoint A to candidate endpoint X) and A to Z (e.g., from fixed endpoint A to candidate endpoint Z) each have a latency that is less than 20 ms, and thus do meet the latency constraints. The transport controller 110 may then order the pathways based on determining which pathway has the lowest latency time. For instance, pathway A to Z may have the lowest latency time when compared to pathways A to X and A to Y. Accordingly, pathway A to Z may be identified as the best pathway based on the latency constraints.

At 412, the transport controller 110 may translate the intent into one or more additional constraint(s). As noted above, the intent may correspond to external intent of the end-to-end controller 104. Accordingly, the transport controller 110 may translate the external intent into additional constraints, such as finding a pathway with the least number of hops. Additionally, the transport controller 110 may apply one or more internal network constraint(s), which may be based on internal information associated with the transport network (e.g., telemetry data, tunnel affinity, potential backup pathway(s), etc.). As noted above, the internal network constraint(s) may correspond to a current state of the transport network. For instance, the internal network constraint(s) may indicate a router in a pathway that is loaded, such that the transport controller 110 does not want a pathway to include the router. Additional information the transport controller may consider when determining the optimal pathway includes current and historical transport network traffic trends and/or internal analytics information (e.g., real-time telemetry data and internal analytics functions). As illustrated in FIG. 4A, based on applying the intent(s), the transport controller 110 may determine that pathway A to X is the optimal pathway (e.g., despite pathway A to Z being best for latency conditions).

As illustrated in FIG. 4B, at 414, the transport controller 110 may provision the A to Z pathway as the best pathway for latency. As noted above, based on identifying the A to Z pathway as having the lowest latency time of the pathways and meeting the latency constraint(s), the transport controller 110 may dynamically and automatically provision the A to X pathway for the network slice. For instance, the transport controller 110 may make the connection between the fixed endpoint A and endpoint X available, such that the end-to-end controller 104 may deploy the UPF to endpoint X.

At 416, the transport controller 110 may send a transport slice response to the end-to-end controller 104. In some examples, the transport slice response 416 may comprise an indication of the provisioned pathway (e.g., "A to X pathway chosen") and a connection status of the pathway (e.g., "success").

At 418, the end-to-end controller 104 may send a core slice request to the other subdomain controller(s) 402. The core slice request 418 may indicate an endpoint (e.g., "location Z"). In some examples, location Z may correspond to endpoint Z. In some examples, the core slice request may correspond to a second network slice. The second network slice may be different from the network slice associated with the transport slice request 408. In some examples, the second network slice may correspond to a second portion of the network slice associated with the slice provisioning request 404.

At 420, the end-to-end controller 104 may receive a core slice response from the other subdomain controller(s) 402.

At 422, the end-to-end controller 104 may send a slice provisioning response to the user device 102. For instance, the slice provisioning response 422 may be sent to the customer facing controller of the user device 102. In some examples, the slice provisioning response may comprise a status associated with whether the slice provisioning request 404 was completed. For example, the slice provisioning response 422 may indicate that the network slice was successfully provisioned.

Accordingly, the end-to-end controller may generate a transport slice request that comprises multiple candidate endpoints and then offloads the decision process to an intelligent network transport controller. In this way, the transport controller is better positioned to dynamically and automatically make a placement decision regarding the network slice, using data that is unavailable to the end-to-end orchestrator. Thus, the transport controller may utilize real-time network telemetry data (e.g., high CPUs, how many surfaces it has, how loaded it is, how much traffic is going through it, etc.) from all transport devices in the pathway, historical information, and other analytic data, intent (external and internal intent) along with existing slice placement and reservation information, to dynamically select and provision the optimal pathway.

Figure 5:
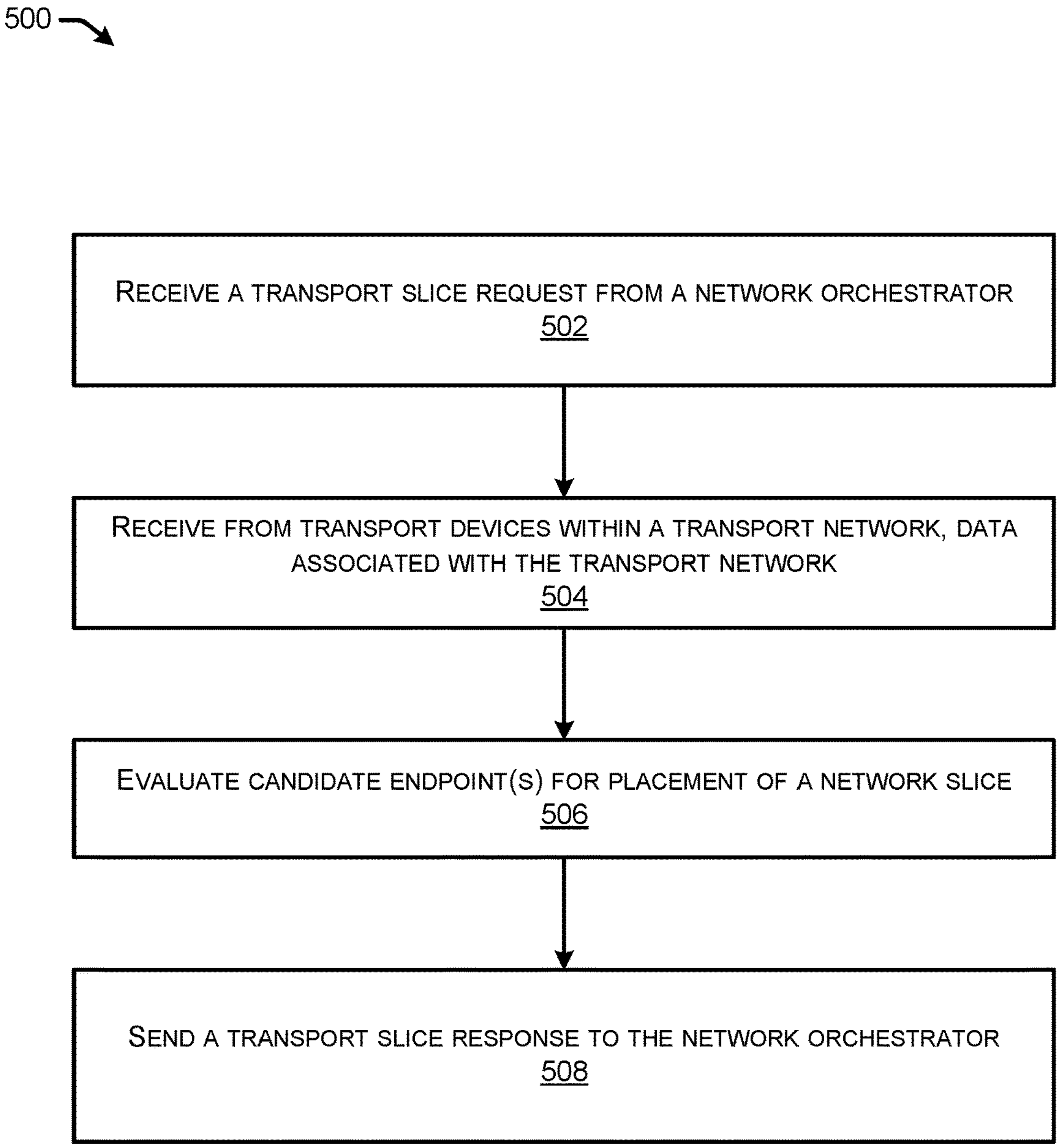
FIG. 5 illustrates a flow diagram of an example method for a system to enable dynamic endpoint selection based on transport conditions.

FIG. 5 illustrates a flow diagram of an example method 500 for a system to enable dynamic endpoint selection based on transport conditions. In some instances, the techniques may be performed by a system (e.g., one or more devices), such as the transport controller 110, end-to-end controller 104, a combination thereof, and/or any other devices (e.g., hardware offload chips and/or any other device). The techniques of method 500 may be performed by a system that includes one processor, or more than one processor.

At 502, the system may receive a transport slice request from a network orchestrator. In some examples, the transport slice request may comprise a list including a fixed endpoint, one or more candidate endpoints, and one or more constraints. In some examples, the transport controller and the transport network are included as part of a 5G network and the network orchestrator is an end-to-end controller within the 5G network. In some examples, the one or more constraints correspond to one or more service level objectives or service level expectations associated with a user.

In some examples, the transport slice request may correspond to a transport slice feasibility request, such as the transport slice feasibility request 308 described above.

In some examples, the network orchestrator generates the list in response to receiving a slice provisioning request from a user device, the list further comprising indications of specific constraints associated with each network slice.

At 504, the system may receive from transport devices within a transport network, data associated with the transport network. In some examples, the data comprises telemetry data associated with the transport devices, historical data associated with the transport devices, and analytic data associated with the transport devices.

At 506, the system may evaluate the candidate endpoint (s) for placement of a network slice. In some examples, the evaluating may be performed in real-time. In some examples, evaluating is based at least in part on utilizing a machine learning model, such as a YANG model. In some examples, the system may evaluate feasibility of each candidate endpoint based on the constraints.

In some examples, evaluating the one or more candidate endpoints further comprises evaluating each respective pathway from the fixed endpoint to each respective candidate endpoint based on the one or more constraints. In some examples, evaluating comprises determining, based at least in part on the evaluating, a best candidate pathway for the one or more constraints and provisioning the best candidate pathway.

At 508, the system may send a transport slice response to the network orchestrator. In some examples, the transport slice response indicates that the best candidate pathway is selected and provisioned. In some examples, the transport slice response indicates a connection status associated with a candidate endpoint and/or a pathway.

In some examples, such as where the transport slice request comprises a feasibility request, the system may determine, based at least in part on evaluating each of the one or more candidate endpoints for feasibility based at least in part on the data and the one or more constraints, one or more feasible endpoints of the one or more candidate endpoints. In this example, the system may order the one or more feasible endpoints based at least in part on the one or more constraints. The system may send, to the network orchestrator, the transport slice response, the transport slice response indicating an order of the one or more feasible endpoints. The system may receive, from the network orchestrator, a second transport slice request comprising a selection of a feasible endpoint of the one or more feasible endpoints. The system may provision, based on the second transport slice request, a pathway from the fixed endpoint to the feasible endpoint.

Figure 6:
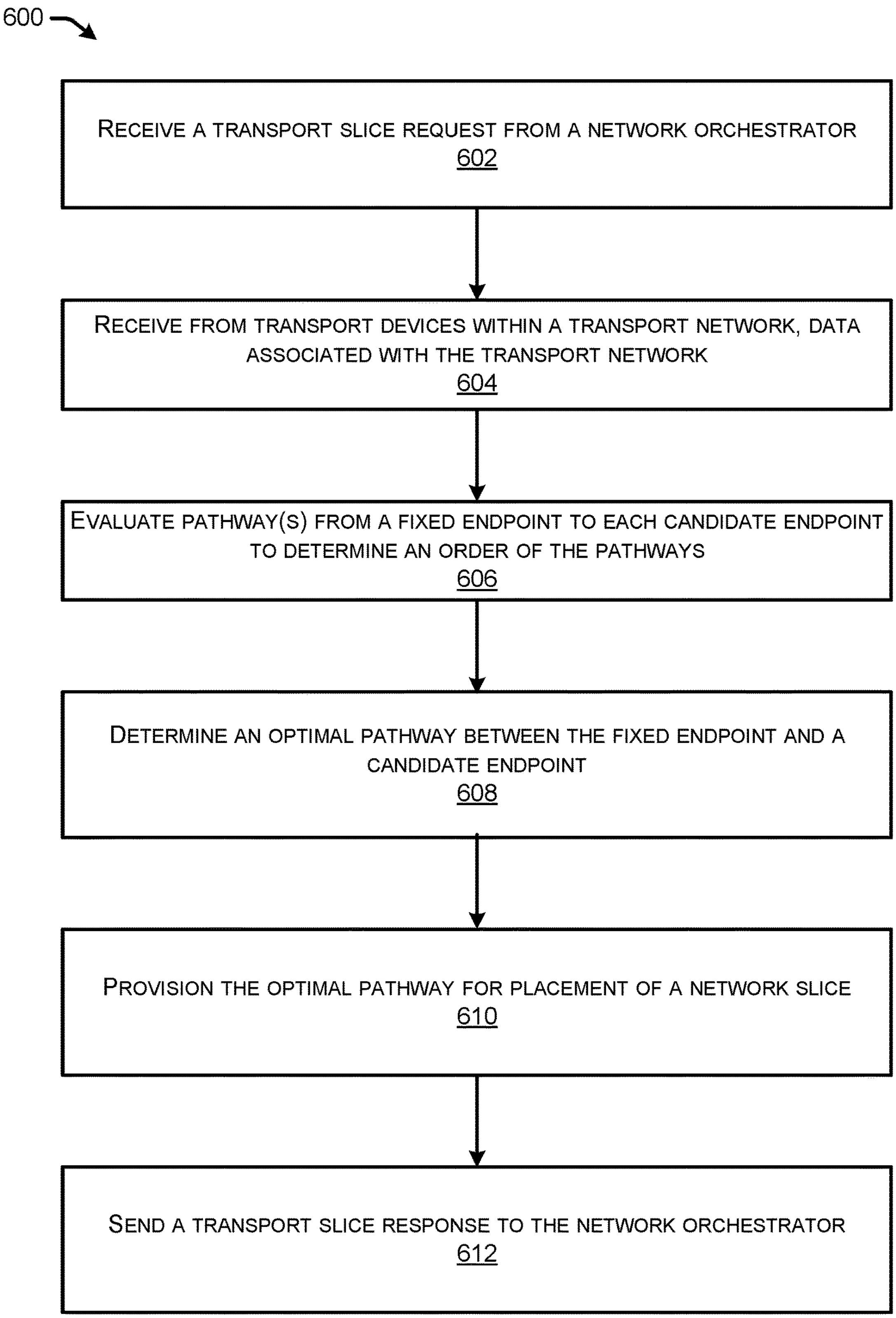
FIG. 6 illustrates a flow diagram of an example method for a enabling a transport controller to dynamically evaluate and select a pathway based on various constraints and intents.

FIG. 6 illustrates a flow diagram of an example method 600 for a system to enable a transport controller to dynamically evaluate and select a pathway based on various constraints and intents. In some instances, the techniques may be performed by a system (e.g., one or more devices), such as the transport controller 110, end-to-end controller 104, a combination thereof, and/or any other devices (e.g., hardware offload chips and/or any other device). The techniques of method 600 may be performed by a system that includes one processor, or more than one processor.

At 602, the system may receive a transport slice request from a network orchestrator. In some examples, the transport slice request is associated with one or more network slices. In some examples, the transport slice request may comprise a list including a fixed endpoint, one or more candidate endpoints, a constraint, and one or more intents. In some examples, the transport controller and the transport network are included as part of a 5G network and the network orchestrator is an end-to-end controller within the 5G network.

At 604, the system may receive from transport devices within a transport network, data associated with the transport network. In some examples, the data comprises telemetry data associated with the transport devices, historical data associated with the transport devices, and analytic data associated with the transport devices.

At 606, the system may evaluate pathway(s) from a fixed endpoint to each candidate endpoint to determine an order of the pathways. In some examples, the evaluating may be performed in real-time. In some examples, evaluating is based at least in part on utilizing a machine learning model, such as a YANG model. In some examples, the system may evaluate feasibility of each candidate endpoint based on the constraints.

In some examples, evaluating the one or more candidate endpoints further comprises evaluating each respective pathway from the fixed endpoint to each respective candidate endpoint based on the one or more constraints. In some examples, evaluating comprises determining, based at least in part on the evaluating, a best candidate pathway for the one or more constraints and provisioning the best candidate pathway.

At 608, the system may determine an optimal pathway between the fixed endpoint and a candidate endpoint. In some examples, the system may determine the optimal pathway based at least in part on the intent and/or second data of the transport controller. In some examples, the second data may comprise internal network constraints associated with the transport controller and analytic data associated with the transport controller.

In some examples, determining the optimal pathway may comprise: translating the intent into first constraints associated with the pathways; determining the internal network constraints, the internal network constraints comprising transport traffic trends; and applying the first constraints, the internal network constraints, and the analytic data to the pathways to determine the optimal pathway.

At 610, the system may provision the optimal pathway for placement of a network slice. In some examples, the system may provision the optimal pathway automatically and in near real-time.

At 612, the system may send a transport slice response to the network orchestrator. In some examples, the transport slice response may include an indication of the provisioned pathway and a connection status.

Figure 7:
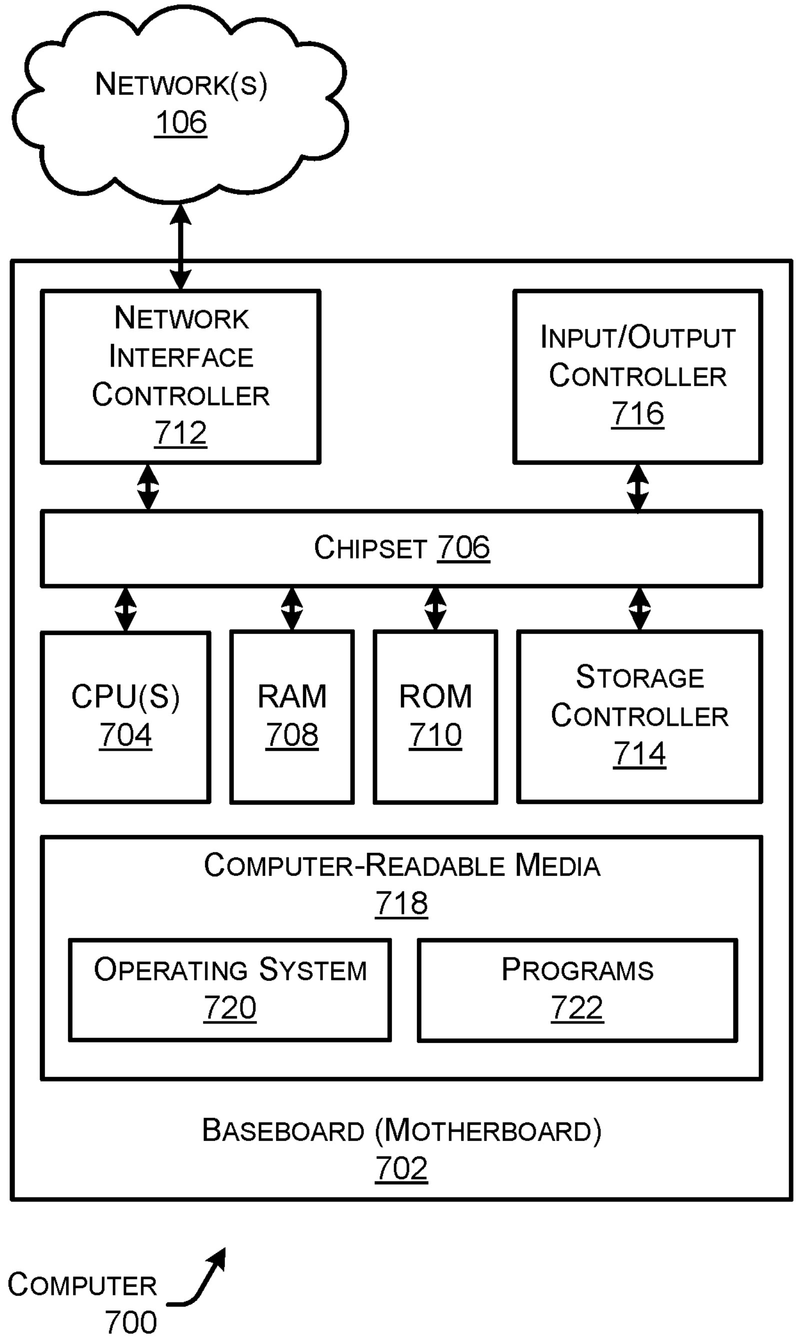
FIG. 7 is a computer architecture diagram showing an illustrative computer hardware architecture for implementing a server device that can be utilized to implement aspects of the various technologies presented herein.

FIG. 7 shows an example computer architecture for a device capable of executing program components for implementing the functionality described above. The computer architecture shown in FIG. 7 illustrates any type of computer 700, such as a conventional server computer, workstation, desktop computer, laptop, tablet, network appliance, e-reader, smartphone, or other computing device, and can be utilized to execute any of the software components presented herein. The computer may, in some examples, correspond to a transport controller 110, end-to-end controller 104, transport network device(s) 116, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as network(s) 106. The chipset 706 can include functionality for providing network connectivity through a NIC 712, such as a gigabit Ethernet adapter. The NIC 712 is capable of connecting the computer 700 to other computing devices over the network(s) 106. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the transport controller 110, end-to-end controller 104, transport network device(s) 116, and/or any components included therein, may be supported by one or more devices similar to computer 700. Stated otherwise, some or all of the operations performed by the transport controller 110, end-to-end controller 104, transport network device(s) 116, and or any components included therein, may be performed by one or more computers.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a transport controller 110, end-to-end controller 104, transport network device(s) 116, and/or any other device. The computer 700 may include one or more hardware processors (e.g., such as CPUs 704 (processors)) configured to execute one or more stored instructions. The processor(s) may comprise one or more cores. Further, the computer 700 may include one or more network interfaces configured to provide communications between the computer 700 and other devices, such as the communications described herein as being performed by the transport controller 110, end-to-end controller 104, transport network device(s) 116, and/or any other device. The network interfaces may include devices configured to couple to personal area networks (PANs), user defined networks (UDNs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for utilizing a transport controller to provide a critical mapping from intent to actual transport network characteristics when selecting and placing network slices. For instance, the programs 722 may cause the computer 700 to perform techniques including receiving, from a network orchestrator, a transport slice request associated with a network slice, the transport slice request comprising a list including a fixed endpoint, one or more candidate endpoints, and one or more constraints. In some examples, the techniques include receiving, from transport devices within the transport network, data associated with the transport network. The techniques further include evaluating, based at least in part on the data and the transport slice request, the one or more candidate endpoints for placement of the network slice. The techniques also include sending, based at least in part on the evaluating, a transport slice response to the network orchestrator.

Additionally, or alternatively the programs 722 may cause the computer 700 to perform techniques including: receiving, from a network orchestrator, a transport slice request associated with a network slice, the transport slice request comprising a list including a fixed endpoint, one or more candidate endpoints, a constraint, and an intent. The techniques may include receiving, from transport devices within the transport network, data associated with the transport network. The techniques may include evaluating, based at least in part on the data and the transport slice request, pathways from the fixed endpoint to each candidate endpoint of the one or more candidate endpoints to determine an order of the pathways. The techniques may further include determining, based at least in part the intent and second data of the transport controller, an optimal pathway of the pathways between the fixed endpoint and a candidate endpoint. The techniques may also include provisioning, the optimal pathway from the fixed endpoint to the candidate endpoint for placement of the network slice. The techniques may include sending a transport slice response to the network orchestrator.

In this way, the techniques described herein enable an end-to-end controller to offload decisions about placement of network slices to the transport controller. By doing so, the transport controller can intelligently determine optimal placement based on intent (e.g., external intent of the end-to-end controller and internal intent of the transport controller), internal transport network analytics functions, SLO/SLE constraints, and real-time telemetry data, thereby providing dynamic and optimal placement of network slices. That is the described techniques dynamically utilize information from within the transport domain to define the placement of network slices (e.g., such as in the 5GC or RAN domains). Thus, placements are more accurate, thereby reducing latency and improving functioning of the network, as well as providing an improved user experience by meeting SLO/SLE constraints.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a transport controller of a transport network, comprising:

receiving, from a network orchestrator, a transport slice request associated with a network slice, the transport slice request comprising a list including a fixed endpoint, one or more candidate endpoints, and one or more constraints;

receiving, from transport devices within the transport network, data associated with the transport network;

evaluating, based at least in part on the data and the transport slice request, the one or more candidate endpoints for placement of the network slice; and sending, based at least in part on the evaluating, a transport slice response to the network orchestrator.

2. The method of claim 1, wherein the transport controller and the transport network are included as part of a 5G network and the network orchestrator is an end-to-end controller within the 5G network.

3. The method of claim 1, wherein the transport slice request comprises a feasibility request, the method further comprising:

determining, based at least in part on evaluating each of the one or more candidate endpoints for feasibility based at least in part on the data and the one or more constraints, one or more feasible endpoints of the one or more candidate endpoints;

ordering the one or more feasible endpoints based at least in part on the one or more constraints;

sending, to the network orchestrator, the transport slice response, the transport slice response indicating an order of the one or more feasible endpoints;

receiving, from the network orchestrator, a second transport slice request comprising a selection of a feasible endpoint of the one or more feasible endpoints; and provisioning, based on the second transport slice request, a pathway from the fixed endpoint to the feasible endpoint.

4. The method of claim 1, wherein evaluating the one or more candidate endpoints further comprises evaluating each respective pathway from the fixed endpoint to each respective candidate endpoint based on the one or more constraints, the method further comprising:

determining, based at least in part on the evaluating, a best candidate pathway for the one or more constraints;

provisioning the best candidate pathway; and sending the transport slice response, wherein the transport slice response indicates that the best candidate pathway is selected and provisioned.

5. The method of claim 1, wherein the one or more constraints correspond to one or more service level objectives or service level expectations associated with a user.

6. The method of claim 1, wherein the network orchestrator generates the list in response to receiving a slice provisioning request from a user device, the list further comprising indications of specific constraints associated with each network slice.

7. The method of claim 1, wherein the data comprises telemetry data associated with the transport devices, historical data associated with the transport devices, and analytic data associated with the transport devices, and wherein the evaluating is performed in real-time.

8. The method of claim 1, wherein evaluating is based at least in part on utilizing a machine learning model.

9. A system comprising:

one or more processors; and non-transitory computer-readable media storing instructions that, when executed by the one or more processors, cause the system to perform operations comprising:

receiving, by a transport controller of a transport network and from a network orchestrator, a transport slice request associated with a network slice, the transport slice request comprising a list including a fixed endpoint, one or more candidate endpoints, and one or more constraints;

receiving, from transport devices within the transport network, data associated with the transport network;

evaluating, based at least in part on the data and the transport slice request, the one or more candidate endpoints for placement of the network slice; and sending, based at least in part on the evaluating, a transport slice response to the network orchestrator.

10. The system of claim 9, wherein the transport controller and the transport network are included as part of a 5G network and the network orchestrator is an end-to-end controller within the 5G network.

11. The system of claim 9, wherein the transport slice request comprises a feasibility request, the operations further comprising:

determining, based at least in part on evaluating each of the one or more candidate endpoints for feasibility based at least in part on the data and the one or more constraints, one or more feasible endpoints of the one or more candidate endpoints;

ordering the one or more feasible endpoints based at least in part on the one or more constraints;

sending, to the network orchestrator, the transport slice response, the transport slice response indicating an order of the one or more feasible endpoints;

receiving, from the network orchestrator, a second transport slice request comprising a selection of a feasible endpoint of the one or more feasible endpoints; and provisioning, based on the second transport slice request, a pathway from the fixed endpoint to the feasible endpoint.

12. The system of claim 9, wherein evaluating the one or more candidate endpoints further comprises evaluating each respective pathway from the fixed endpoint to each respective candidate endpoint based on the one or more constraints, the operations further comprising:

determining, based at least in part on the evaluating, a best candidate pathway for the one or more constraints;

provisioning the best candidate pathway; and sending the transport slice response, wherein the transport slice response indicates that the best candidate pathway is selected and provisioned.

13. The system of claim 9, wherein the one or more constraints correspond to one or more service level objectives or service level expectations associated with a user.

14. The system of claim 9, wherein the network orchestrator generates the list in response to receiving a slice provisioning request from a user device, the list further comprising indications of specific constraints associated with each network slice.

15. The system of claim 9, wherein the data comprises telemetry data associated with the transport devices, historical data associated with the transport devices, and analytic data associated with the transport devices, and wherein the evaluating is performed in real-time.

16. The system of claim 9, wherein evaluating is based at least in part on utilizing a machine learning model.

17. A method implemented by a transport controller of a transport network, comprising:

receiving, from a network orchestrator, a transport slice request associated with a network slice, the transport slice request comprising a list including a fixed endpoint, one or more candidate endpoints, a constraint, and an intent;

receiving, from transport devices within the transport network, data associated with the transport network;

evaluating, based at least in part on the data and the transport slice request, pathways from the fixed endpoint to each candidate endpoint of the one or more candidate endpoints to determine an order of the pathways;

determining, based at least in part the intent and second data of the transport controller, an optimal pathway of the pathways between the fixed endpoint and a candidate endpoint;

provisioning, the optimal pathway from the fixed endpoint to the candidate endpoint for placement of the network slice; and sending a transport slice response to the network orchestrator.

18. The method of claim 17, wherein the second data comprises internal network constraints associated with the transport controller and analytic data associated with the transport controller.

19. The method of claim 18, wherein determining the optimal pathway further comprises:

translating the intent into first constraints associated with the pathways;

determining the internal network constraints, the internal network constraints comprising transport traffic trends; and applying the first constraints, the internal network constraints, and the analytic data to the pathways to determine the optimal pathway.

20. The method of claim 17, wherein the transport controller and the transport network are included as part of a 5G network and the network orchestrator is an end-to-end controller within the 5G network.

* * * * *